US011644006B2

(12) United States Patent
Cieslak et al.

(10) Patent No.: US 11,644,006 B2
(45) Date of Patent: May 9, 2023

(54) REINFORCING STRUCTURES FOR WIND TURBINE BLADES

(71) Applicant: Vestas Wind Systems A/S, Aarhus N. (DK)

(72) Inventors: Chris Cieslak, London (GB); Luke Spandley, Ventnor (GB)

(73) Assignee: Vestas Wind Systems A/S, Aarhus N (DK)

( * ) Notice: Subject to any disclaimer, the term of this patent is extended or adjusted under 35 U.S.C. 154(b) by 757 days.

(21) Appl. No.: 15/500,320

(22) PCT Filed: Jul. 29, 2015

(86) PCT No.: PCT/DK2015/050230
§ 371 (c)(1),
(2) Date: Jan. 30, 2017

(87) PCT Pub. No.: WO2016/015736
PCT Pub. Date: Feb. 4, 2016

(65) Prior Publication Data
US 2017/0218918 A1 Aug. 3, 2017

(30) Foreign Application Priority Data

Jul. 31, 2014 (GB) .................................. 1413549

(51) Int. Cl.
*F03D 1/06* (2006.01)
*B32B 5/26* (2006.01)
(Continued)

(52) U.S. Cl.
CPC ............ *F03D 1/0675* (2013.01); *B29C 70/42* (2013.01); *B32B 5/024* (2013.01); *B32B 5/12* (2013.01);
(Continued)

(58) Field of Classification Search
CPC .. F03D 1/0675; F03D 1/06833; F03D 1/0683; B32B 5/26; B32B 5/12;
(Continued)

(56) References Cited

U.S. PATENT DOCUMENTS 5,802,839 A * 9/1998 Van Hook ................ D02G 3/28
474/263
2005/0241119 A1* 11/2005 Efremova .......... A44B 18/0015
24/442
(Continued)

FOREIGN PATENT DOCUMENTS

CN 101595300 A 12/2009
CN 104812812 A 7/2015
(Continued)

OTHER PUBLICATIONS

Textile Glossary, p. 168 (Year: 2001).*
(Continued)

*Primary Examiner* — David E Sosnowski
*Assistant Examiner* — Maxime M Adjagbe
(74) *Attorney, Agent, or Firm* — Wood Herron & Evans LLP

(57) ABSTRACT

A wind turbine blade including an elongate reinforcing structure, the reinforcing structure comprising a plurality of strips of fibre-reinforced polymer arranged into a stack structure, and at least one adjacent pair of the plurality of strips including an infusion promoting layer, wherein the infusion promoting layer is a fabric comprising a plurality of twisted yarns. The invention is also expressed as a method of assembling a wind turbine blade.

27 Claims, 5 Drawing Sheets

(51) Int. Cl.
*B32B 5/12* (2006.01)
*B32B 5/02* (2006.01)
*F03D 13/00* (2016.01)
*B29C 70/42* (2006.01)
*B29K 105/08* (2006.01)
*B29L 31/08* (2006.01)

(52) U.S. Cl.
CPC ............... *B32B 5/26* (2013.01); *F03D 13/00* (2016.05); *B29K 2105/08* (2013.01); *B29L 2031/085* (2013.01); *B32B 2250/20* (2013.01); *B32B 2250/42* (2013.01); *B32B 2262/0269* (2013.01); *B32B 2262/101* (2013.01); *B32B 2262/106* (2013.01); *B32B 2307/50* (2013.01); *B32B 2307/718* (2013.01); *B32B 2307/738* (2013.01); *B32B 2603/00* (2013.01); *F05B 2280/6001* (2013.01); *Y02E 10/72* (2013.01)

(58) Field of Classification Search
CPC ..... B32B 5/024; B32B 5/00; B32B 2307/718; B32B 2262/101; B32B 2262/106; B29L 2031/085; F05B 2280/6001
USPC .......................................................... 428/377
See application file for complete search history.

(56) References Cited

U.S. PATENT DOCUMENTS

| | | | |
|---|---|---|---|
| 2007/0160479 A1 | 7/2007 | Livingston et al. | |
| 2008/0096001 A1* | 4/2008 | Emden | A41D 31/02 428/222 |
| 2011/0243750 A1* | 10/2011 | Gruhn | B29B 11/16 416/226 |
| 2012/0064788 A1* | 3/2012 | Peters | C08K 7/14 442/173 |
| 2013/0280477 A1* | 10/2013 | Davis | B32B 5/12 428/109 |
| 2014/0119936 A1* | 5/2014 | Dahl | B29C 70/547 416/230 |
| 2014/0301859 A1* | 10/2014 | Hancock | F03D 1/0675 416/230 |

FOREIGN PATENT DOCUMENTS

| | | |
|---|---|---|
| EP | 1520983 A1 | 4/2005 |
| EP | 1990178 A1 | 11/2008 |
| EP | 2687356 A1 | 1/2014 |
| GB | 2497578 A | 6/2013 |
| WO | 2006082479 A1 | 8/2006 |
| WO | 2010122350 A1 | 10/2010 |
| WO | 2011146151 A2 | 11/2011 |
| WO | 2012037219 A1 | 3/2012 |
| WO | 2012141851 A1 | 10/2012 |
| WO | 2013133437 A1 | 9/2013 |
| WO | 2014079565 A2 | 5/2014 |
| WO | 2015058775 A1 | 4/2015 |
| WO | 2015067281 A1 | 5/2015 |

OTHER PUBLICATIONS

Intellectual Property Office, Search and Examination Report in GB1413549.5, dated Jul. 22, 2015.
European Patent Office, International Search Report and Written Opinion in PCT Application No. PCT/DK2015/050230, dated Sep. 21, 2015.
European Patent Office, Examination Report in EP Application No. 15744481.1, dated Mar. 29, 2019.
Intellectual Property India, Examination Report in Indian Application No. 201717005366, dated Sep. 27, 2019.
The State Intellectual Property Office of China, First Notification of Office Action in CN Application No. 201580050004.3, dated Jun. 20, 2018.

* cited by examiner

REINFORCING STRUCTURES FOR WIND TURBINE BLADES

FIELD OF THE INVENTION

The present invention relates to wind turbine blades and particularly to a reinforcing structure such as a spar cap used within a wind turbine blade to provide the blade with additional strength and rigidity.

BACKGROUND TO THE INVENTION

The design of composite wind turbine blades is a compromise that strikes a balance between aerodynamic and structural priorities. The drive is now towards larger blades in order to maximise energy capture of the turbine installation. However, larger blades experience increased forces during use which increases the likelihood of the blades suffering damage.

A modern utility-scale wind turbine blade comprises a structural beam that is typically formed from a two-part hollow shell. The blade is stiffened to prevent it from bending excessively and, usually, each shell incorporates one or more relatively stiff strips or 'spars' that run along the length of the blade. To provide the blade with the necessary strength to withstand the shear forces acting on it during operation, the opposing spars are interconnected by a construction called a shear web. There are two main approaches to achieving this design, and one of these approaches is shown in FIG. 1.

In FIG. 1, a blade 2 has a hollow shell structure comprising an upper half shell 4 and a lower half shell 6 that are united to form the complete shell having an aerofoil cross section. Each half shell is a composite structure comprising inner and outer laminate layers or 'skins' 8,10 of material, for example fibre reinforced plastic (FRP).

The upper and lower half shells 4,6 each includes a strengthening structure comprising two spar caps 12, each of which runs along the spanwise length of the blade 2 from the blade root towards the blade tip. The spar caps 12 may also be known by other terminology in the art such as 'beams' or 'girders'. It is preferable for the spar caps 12 to be extremely stiff and lightweight and for this reason they may be fabricated from infused stacks of carbon fibre pultruded strips that are bonded to the outer blade skin 10, by a suitable engineering adhesive. Carbon fibre is not essential, however, but it generally preferred due to its very high strength to weight ratio. In this blade 2, the spar caps 12 are embedded in the laminated FRP layers and so form an integral part of the shells 4, 6. Such a blade design is sometimes referred to as a 'structural shell'. Certain regions of the blade incorporate lightweight cores 14 such as structural foam or balsa wood that are sandwiched between the outer and inner skins 8, 10 and located in between the spars 12. Such a sandwich panel construction improves bending stiffness and reduces the risk of buckling in these regions. Similar blade structures are also known having a single spar cap.

Referring more specifically to the spar caps 12, each of these has a substantially rectangular cross section and is made up of a stack of pre-fabricated elongate reinforcing planks or strips 18. The strips 18 are pultruded members of carbon-fibre reinforced plastic (CFRP), and are substantially flat and of rectangular cross section. The number of strips 18 in the stack depends upon the thickness of the strips 18 and the required thickness of the shells 4,6, but typically the strips 18 each have a thickness of a few millimetres and there may be between two and twelve strips in the stack. The strips 18 have a high tensile strength, and thus have a high load bearing capacity.

The blade is made using a resin-infusion process in which components of the blade are laid up in a blade mould. Firstly one or more layers of dry glass-fibre fabric are arranged in the mould to form the outer skin of the blade. Then, elongate panels of structural foam are arranged on top of the glass-fibre layer to form the sandwich panel cores 14 referred to in FIG. 1. The foam panels are spaced apart relative to one another to define a pair of channels in between them for receiving respective spar caps. To assemble the spar caps, a plurality of pultruded strips of CFRP, as described above with reference to FIG. 1, are stacked in the respective channels. It is also possible to lay pre-assembled stacks into the channels.

Once the spar caps are in place, more dry glass-fibre fabric layers are arranged on top of the foam panels and the spar caps. This forms the inner skin of the blade. Next, vacuum bagging film is placed over the mould to cover the layup. Sealing tape is used to seal the vacuum bagging film to a flange of the mould and a vacuum pump is used to withdraw air from the interior volume between the mould and the vacuum bagging film. Once a suitable partial vacuum has been established, resin is introduced to the sealed volume at one more insertion points. The resin infuses between the various laminate layers and fills any gaps in the laminate layup. Once sufficient resin has been supplied to the mould, the mould is heated whilst the vacuum is maintained to cure the resin and bond the various layers together to form the half shell of the blade. The other half shell is made according to an identical process. Suitable strengthening web structures are arranged with respect to the spar caps. Adhesive is then applied along the leading and trailing edges of the shells and the shells are bonded together to form the complete blade.

Other examples of rotor blades having spar caps integral with the shell are described in EP1520983, WO2006/082479 and GB2497578.

The resin infusion process relies on there being suitable pathways for resin to infiltrate through and between the various components of the blade layup. Problems that can become apparent are airlocks forming in parts of the layup through which the resin is unable to flow. Sometimes, resin infiltrates through some parts of the layup more slowly than through other parts and this can also cause problems since the 'wavefront' of the resin flow can divert and travel along an unintended direction which can affect the integrity of the cured blade structure. This can be particularly apparent where the resin travels around and between the individual strips of the spar caps.

It is against this background that the invention has been devised.

SUMMARY OF THE INVENTION

In one aspect, the invention provides a method of making an elongate reinforcing structure for a wind turbine blade. It should be noted that a wind turbine blade is one technical application in which the elongate reinforcing structure is useful, for example as a structural spar, although the invention applies to reinforcing structures in other contexts. The method comprises: arranging a plurality of blade components in a blade mould; and assembling an elongate reinforcing structure in the blade mould relative to the plurality of blade components, wherein the elongate reinforcing structure comprises a plurality of strips of fibre-reinforced polymer arranged in a stack structure, at least one adjacent pair of the plurality of strips including an infusion promoting layer interleaved therebetween, and wherein the or each infusion promoting layer is a fabric comprising a plurality of twisted yarns.

The invention can also be expressed, and therefore also embraces, a wind turbine blade including an elongate reinforcing structure, the reinforcing structure comprising a plurality of strips of fibre-reinforced polymer arranged into a stack structure, and at least one adjacent pair of the plurality of strips including an infusion promoting layer, wherein the infusion promoting layer is a fabric comprising a plurality of twisted yarns.

Beneficially, the use of twisted yarn fabric provides a surprising improvement in controlling the speed of infusion through the blade which enables the infusion speed through the stack structures to be substantially matched to the infusion speed through adjacent regions of the blade structure, which reduces the risk of voids forming within the blades during the infusion process.

The fabric areal weight of the infusion promoting layer may be between approximately 100 gsm and 300 gsm, but preferably is approximately 200 gsm.

The infusion promoting layer may be selected to have a weave pattern of at least one of the group including: a plain weave pattern, a twill weave pattern, a satin weave pattern.

The yarns of the infusion promoting layer may be oriented in a 0/90° configuration or in a +/−45° configuration.

The infusion promoting layer may be a glass-fibre fabric and may be interleaved between each pair of the plurality of strips in order to have the same influence on infusion speed throughout the stack structure.

In one embodiment, the or each infusion promoting layer is arranged in the stack so that at least one edge of the infusion promoting layer overlaps a corresponding edge of an adjacent one of the plurality of strips.

In another aspect, the invention provides a method of fabricating a wind turbine blade in a blade mould, the method comprising: providing an outer blade skin component onto the blade mould; assembling a first elongate reinforcing structure onto the outer blade skin component; assembling a second elongate reinforcing structure onto the outer blade skin component; and providing a partitioning layer of fabric between the first and second elongate reinforcing structures. This ensures that resin infuses evenly between the stack structures and guards against the formation of voids between the stack structures. The stack structures may be as defined previously.

In another aspect, the invention provides a method of assembling a wind turbine blade in a blade mould, comprising: arranging a plurality of blade components in a blade mould; and assembling an elongate reinforcing structure in the blade mould relative to the plurality of blade components. The elongate reinforcing structure comprises a plurality of strips of fibre-reinforced polymer arranged in a stack structure, at least one adjacent pair of the plurality of strips including an infusion promoting layer interleaved therebetween, wherein the or each infusion promoting layer is selected so as to influence the infusion of resin through the stack structure during a resin infusion process.

The infusion promoting layer may be selected so as to influence the speed of resin infusion through the stack structure and, to this end, may be a woven fabric comprising a plurality of interlaced twisted yarns. Further, the fabric may be a biaxial configuration having first and second yarn layers oriented in a +/−45° configuration.

The infusion promoting layer may be selected such that the infusion speed of resin through the stack structure during a resin infusion process is compatible with the resin infusion speed through the plurality of blade components. This guards against voids, hollows and other infusion imperfections forming during the infusion process.

In another aspect, the invention provides an infusible layer or strip configured to be interleaved into a stack of pre-formed structural strips of fibre reinforced polymer so as to form a stacked spar structure of a wind turbine blade, the spacer strip being configured to space apart adjacent pairs of structural strips, wherein the infusible strip is compatible with the resin used in the infusion process and is further configured to permit resin to infuse therethrough so that the spacer strip can be integrated with the spar structure in a finished wind turbine blade, wherein the spacer strip is a woven fabric in which the yarns of said fabric are twisted. The invention extends to the use of that infusible layer or strip to fabricate a structural spar for a wind turbine blade.

In another aspect, the invention provides a method of assembling a wind turbine blade, comprising: arranging a plurality of blade components in a blade mould; assembling an elongate reinforcing structure in the blade mould relative to the plurality of blade components, wherein the elongate reinforcing structure comprises a plurality of strips of fibre-reinforced polymer arranged in a stack structure, at least one adjacent pair of the plurality of strips including an infusion promoting layer interleaved therebetween, wherein the or each infusion promoting layer is selected such that the infusion speed of resin through the stack structure during a resin infusion process is compatible with the resin infusion speed through the plurality of blade components.

It should be noted that preferred and/or optional features of the embodiments of the invention can be combined with other embodiments of the invention and vice versa.

DETAILED DESCRIPTION OF EMBODIMENTS OF THE INVENTION

Figure 1:
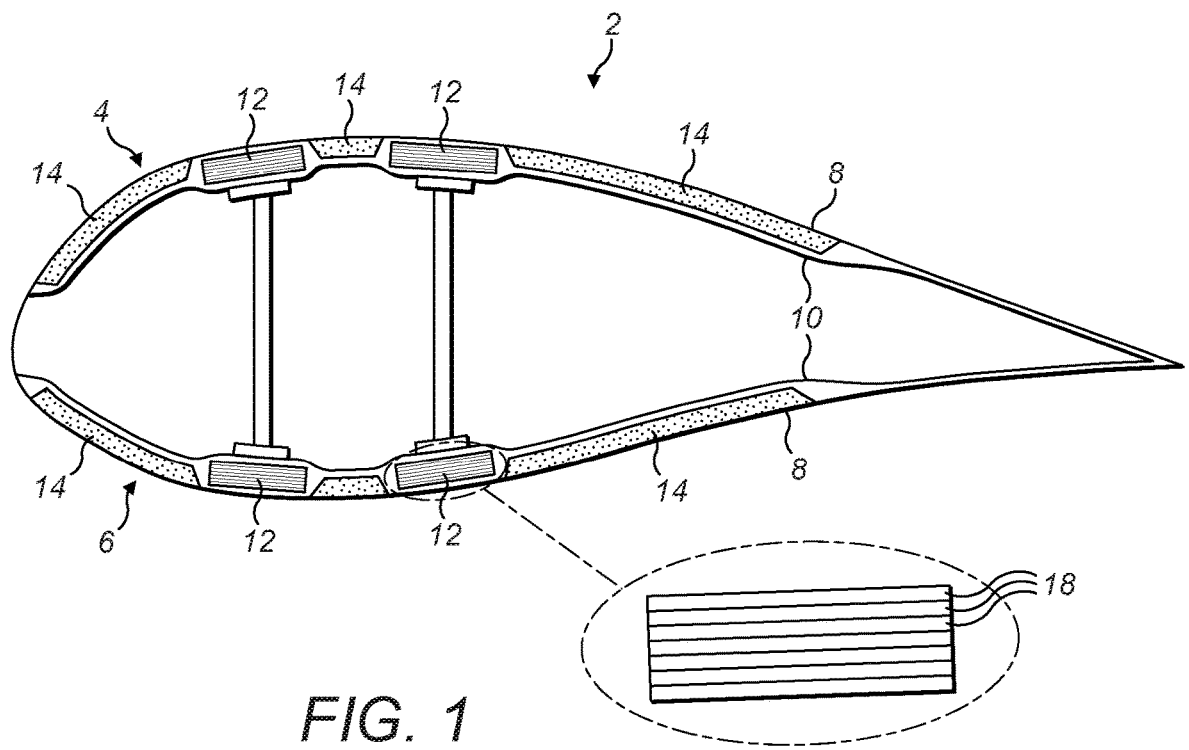
FIG. 1 has already been described by way of background to the invention. Embodiments of the invention will now be described with reference to the following drawings in order for the invention to be fully understood.
Figure 2:
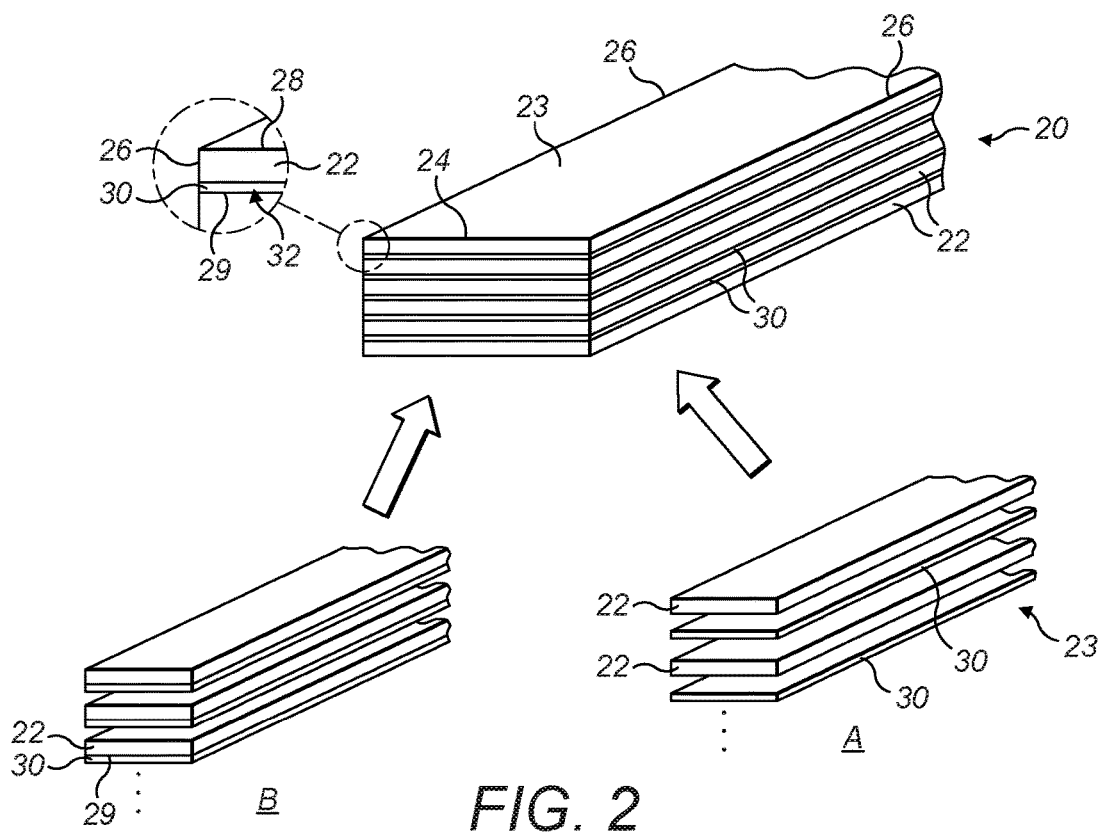
FIG. 2 is a perspective view of part of a spar cap comprising a stack of pultruded strips, and also shows schematically two alternative schemes to illustrate how the spar cap could be assembled.

FIG. 2 illustrates an elongate reinforcing structure 20 for a wind turbine blade. In the embodiments described below, the elongate reinforcing structure 20 is a spar cap like that described above with reference to FIG. 1 by way of introduction, and will be referred to as such from now on.

In FIG. 2 the spar cap 20 is shown on a larger scale so that its individual components can be seen more clearly. The spar cap 20 comprises a plurality of strips 22 of fibre-reinforced polymer arranged in alignment one on top of another in a stack structure 23 Each of the strips 22 extends longitudinally between opposed ends 24 (only one of which is shown in FIG. 2) and comprises opposite sides 26 and upper and lower surfaces 28, 29.

In principle, alternative forms of fibre-reinforced polymer, such as glass- or aramid-fibre based FRPs, may be used for the strips 22 although in practice carbon fibre is preferred for its particularly high strength characteristic. The strips 22 are fabricated by a pultrusion process, as is known in the art, in which resin-soaked fibres are drawn through a pultrusion die so as to form a strip having a uniform cross section along its length wherein the strip is then passed through a curing oven in which the pultruded strip is heated in order to cure the resin matrix.

In this embodiment the stack structure 23 comprises six strips 22 (not all of which are labelled) of fibre-reinforced polymer. Interleaved between each adjacent strip 22 is an infusion promoting layer 30. In the schematic view of FIG. 2, each of the infusion promoting layers 30 has the same plan dimensions as the strips 22 so that the layers 30 cover the entirety of the adjacent surface 28,29 of a strip 22. The plan dimension of the layer 30 could be greater than the strips 22, however. More specifically, each of the infusion promoting layers 30 extends continuously at least between the ends 24 of the strips 22 in a longitudinal direction and also continuously in a transverse direction between opposite sides 26 of the strips 22.

FIG. 2 also illustrates two alternative techniques by which the stack structure 23 may be assembled. The first technique is shown on the right hand side of FIG. 2, identified as 'A', and here a plurality of strips 22 are stacked on top of one another and a plurality of infusion promoting layers 30 are interleaved between the strips 22. All of the strips 22 and the layers 30 are thus aligned to form the stack structure 23. It should be noted that the strips 22 and the layers 30 are shown spaced from one another in FIG. 2 to convey the way in which the stack structure 23 is assembled, but that in assembled form the layers 30 would be squeezed between the strips 22 and the entire assembly may be held in place by a suitable retention means such as one or more straps.

The second technique is shown on the left hand side of FIG. 2, identified as 'B', and here each of the plurality of strips 22 includes an infusion promoting layer 30 integrated onto the lower surface 29 of the strip 22. Again, the strips 22 and the layers 30 are shown spaced apart for clarity. The integration of the infusion promoting layer 30 with each strip 22 may be achieved by way of an in-line process during which the infusion promoting layer 30 is bonded to the strip 22 at a station downstream of where the pultruded strip is cured. In the same manner as the previous technique A, the stack structure 23 may be secured by suitable means such as straps (not shown) so that the strips 22 and the infusion promoting layers 30 are unable to move relative to one another. The straps may be incorporated into the stacks by virtue of the resin infusion process.

In both of the techniques illustrated in FIG. 2, the presence of the infusion promoting layers 30 establishes an interstice or 'infusion region' 32 between an adjacent pair of strips 22 of a predetermined depth which benefits resin flow between the strips 22.

Once the strips 22 and layers 30 have been arranged into the stack structure 23, resin is introduced under vacuum in order to consolidate the stack structure 23 into an integrated component. During this process resin infiltrates around the stack structure 23 and through the infusion promoting layers 30 between the strips 22 whereby the resin-infused stack structure is curable into a finished spar cap. FIG. 2 is diagrammatic but it should be noted that, typically, the resin infusion process would take place in situ with the stack structure 23 positioned within a blade layup, as will be described later.

Having described the general configuration of the stack structure 23, the infusion promoting layer 30 will now be described in more detail. In this embodiment, the infusion promoting layer 30 is a glass fibre fabric material. Preferably, the fabric provides a relatively loose weave which provides relatively low resistance to the flow of resin through the fabric. One example of a suitable material is a 0/90° plain weave glass fibre fabric having a fabric areal weight, or mass per unit area (grams per square metre; gsm), of 200 gsm.

The fibre material has a relatively low areal weight (i.e. mass per unit area), being preferably between about 100 gsm and about 300 gsm, most preferably about 200 gsm, which is sufficiently low such that resin is able to infuse relatively easily through the fibrous structure of the fabric so that the layer of material enhances the infusion process between the strips 22 and also allows the fabric to bond to the adjacent surfaces of the strip 22.

Significantly, in addition to promoting the flow of resin between the strips 22, the presence of the infusion promoting layer 30 establishes a predetermined gap between adjacent strips 22. For example, once compressed in the stack structure 30 prior to resin impregnation, the fabric layer 30 establishes a gap of between 0.1 mm and 0.5 mm in this embodiment. It should be understood that the precise gap between the strips 22 that is established by the infusion promoting layer 30 will depend on the overall scale of the stack structure. However, in a wind turbine blade application, typically the strips 22 will range between 50-400 mm in width and between about 2 mm and 7 mm in thickness, whereas the infusion promoting layer will be approximately 0.2 mm thick. The benefit of this is that the layer prevents localised contact between the facing surfaces of adjacent strips 22 which could otherwise affect the infusion of resin through the infusion region 32.

The inventors have determined that attributes of the infusion promoting layer 30 influence the characteristics of the resin infusion process. In particular, the attributes of the infusion promoting layer 30 may be selected to influence the speed at which resin flows through the infusion promoting layer 30. Influencing the infusion speed of resin through the infusion region 32 may be desirable in order to control how the resin infiltrates through the stack structure 23 relative to the surrounding areas of the layup. For example, an objective may be to increase the speed by which the resin infiltrates through the stack structure 23 in order to avoid 'back-filling' of the stack structure 23 in which resin infuses through it from more than one direction. Therefore, it is important to select the infusion promoting layer so that the infusion speed through it during the resin infusion process is compatible with the speed at which the resin infuses through the plurality of blade components that surround the stack structure 23. In ideal circumstances, the resin infusion speed through the infusion promoting layer should substantially match the speed at which the resin infuses through and around the other blade components. However, it is acceptable if the resin infusion speed through the layer is within around 5% and 15%, preferably 10% of the infusion speed around the other blade components. Note that although infusion speeds vary, a typical infusion speed, by way of example, will be 200 mm over a period of approximately 7 minutes.

Figure 3:
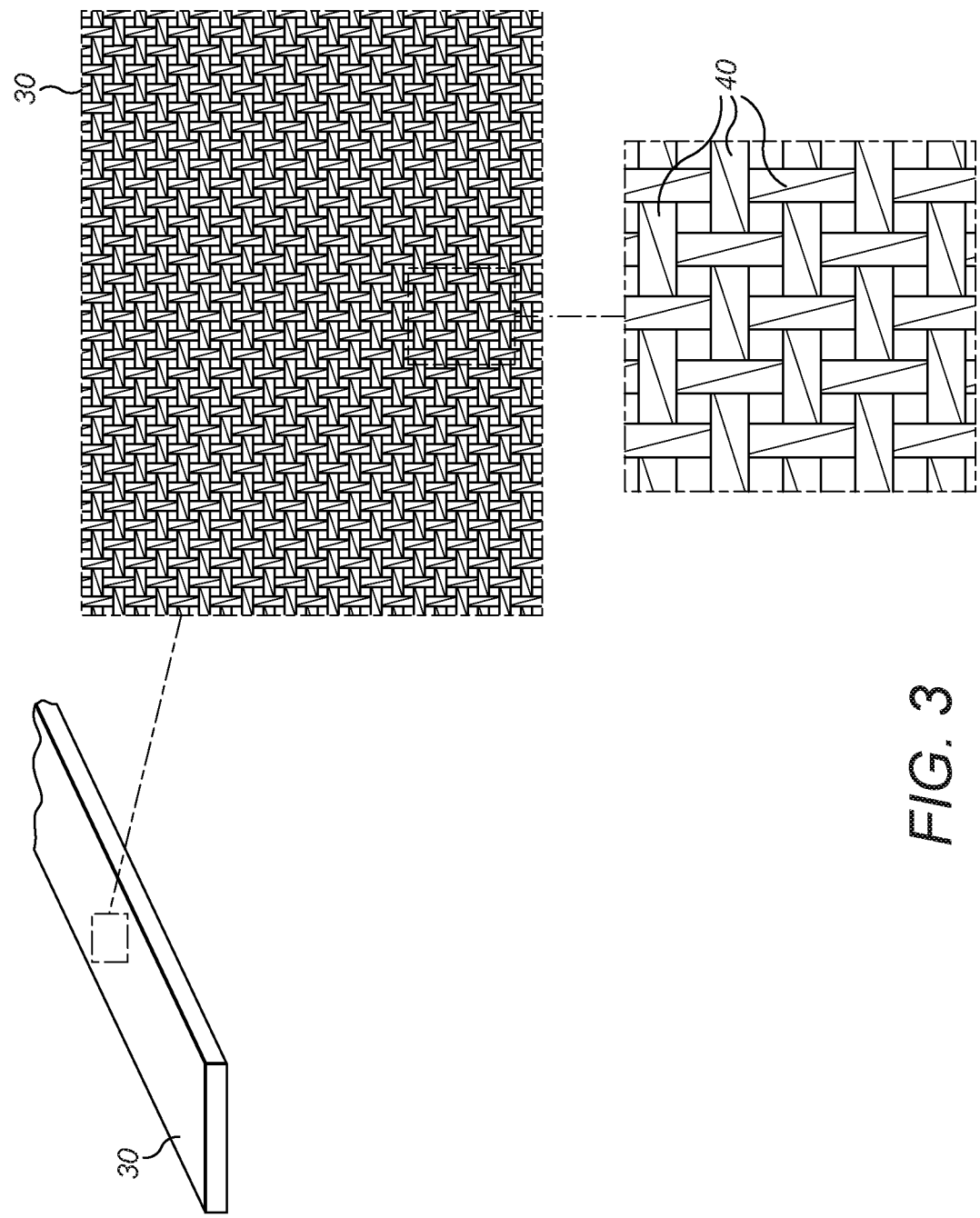
FIG. 3 is an enlarged perspective view of a infusion promoting layer that is incorporated into the spar cap and also includes an inset view showing a patch of the infusion promoting layer in detail.

With this in mind, FIG. 3 illustrates a single infusion promoting layer 30 in which a patch of it is enlarged in the inset panel in order to show the weave of the fabric in detail.

As can be seen, the infusion promoting layer 30 is, once again, a 0/90° woven glass fibre fabric and has a fabric areal weight of 200 gsm. However, in this embodiment the yarns 40 of the fabric are twisted, such that the fibres of the yarns are arranged in a spiral formation about the yarn axis. The inventors have determined that using a twisted yarn fabric having the same areal weight as a non-twisted or 'flat' yarn fabric, increases the speed that resin infuses through the stack structure 23 by a factor of three when compared to the speed at which the resin infuses through the fabric having a 'flat' yarn. In this example, there are approximately five twists per inch. Such a twisted yarn glass fibre fabric is available, for example, from Hexcel Corporation, for example HexForce 6 TF970.

In order to test the infusion speed of the fabric, a portion of the fabric was clamped under a transparent rigid sheet under a predetermined clamping load established by a partial vacuum of less than 50 mbar. The fabric is sealed under the transparent sheet whilst a resin infusion process is applied. To this end, a vacuum is applied along one edge of the sheet whilst resin is introduced at the opposed end of the sheet. This creates a wavefront of resin that infuses through the fabric portion from one edge of the sheet towards the edge of the sheet that is in vacuum. The progress of the wavefront can be observed through the transparent sheet so that the infusion speed can be measured.

Without wishing to be bound by theory it is believed that the twisting of the yarns increases the 'open area' of the fabric which encourages the flow of resin through the material. Since yarns are paired, if the twists per inch were increased, the result would be tighter warps and wefts, which it is thought would result in a marginally thicker material which would be less susceptible to compressing, i.e. under the pressure during assembly. However, whilst the infusion speed is improved, the areal weight of the fabric is unchanged (e.g. 200 gsm in this embodiment) which maintains the ability of the fabric to act as an effective spacer between adjacent pairs of strips 22 in the stack structure 23.

In this embodiment, the twisted yarn fabric is configured as a plain weave in which warp and weft yarns are perpendicular to one another and are configured in a basis 'one over and one under' pattern. However, it is envisaged that other weave patterns would also be advantageous, for example 'twill', 'basket' or 'satin' weave patterns. The key consideration in any of the aforementioned weave patterns is that the yarn should be twisted in order to increase the openness of the weave for a given area weight of fabric.

Figure 4:
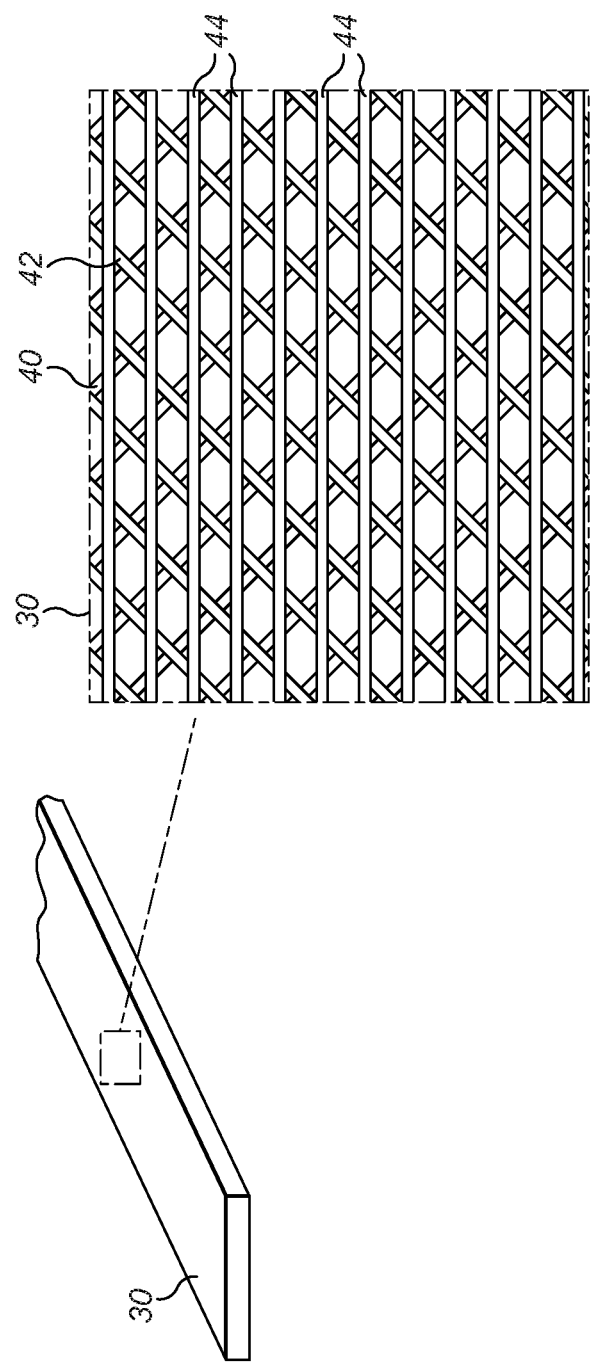
FIG. 4 is an enlarged perspective view, like that in FIG. 3, but which illustrates an alternative infusion promoting layer.

An alternative resin infusion layer 30 is shown in FIG. 4. In this embodiment, the infusion promoting layer 30 is a glass fibre fabric with a fabric areal weight in the range of between 100 gsm and 300 gsm, but preferably 200 gsm in the same way as the previous embodiment.

However, in this embodiment the fabric is a biaxial or 'non-crimp' fabric comprising two layers of yarns 40, 42 that are oriented at +/−45°. The two layers of yarns are joined together by a horizontally oriented stitching yarn 44. Such a fabric is generally known in the art and is available, by way of example, from Metyx Composites under product code X200 E05B.

The inventors have observed that under the same test conditions applied to the twisted yarn fabric of the second embodiment, the fabric of this embodiment shows an infusion speed that it approximately 20-30% faster than the infusion speed observed with the fabric of the second embodiment.

Beneficially, the biaxial fabric may provide greater strength compared to woven 0/90° fabric, although layup of the biaxial fabric may be more problematic due to its tendency to scissor and distort during the layup process. However, if strength of the stack structure is the key consideration, the strength benefit of the biaxial fabric may be considered to outweigh the challenges in achieving a robust and repeatable layup.

The embodiments of FIGS. 3 and 4 explained above illustrate two potential glass fibre fabrics that may be used as a resin infusion layer in fabricating a stack structure 23 for a spar cap 20 of a wind turbine blade. It will be appreciated that in each of the embodiments, the selection of the attributes of the fabric has an influence on the resin infusion process, and particularly the speed at which the resin infuses through the fabric. Therefore, by selecting the weave characteristic of the fabric used as the infusion promoting layer 30, it is possible to tune the infusion speed through the infusion region as required in order to match the infusion of the spar cap closely to the overall infusion requirements in the broader context of the blade layup.

Against this context, it should be appreciated that other fabrics not described here may also be selected that have an appropriate influence on the resin infusion process.

Figure 5:
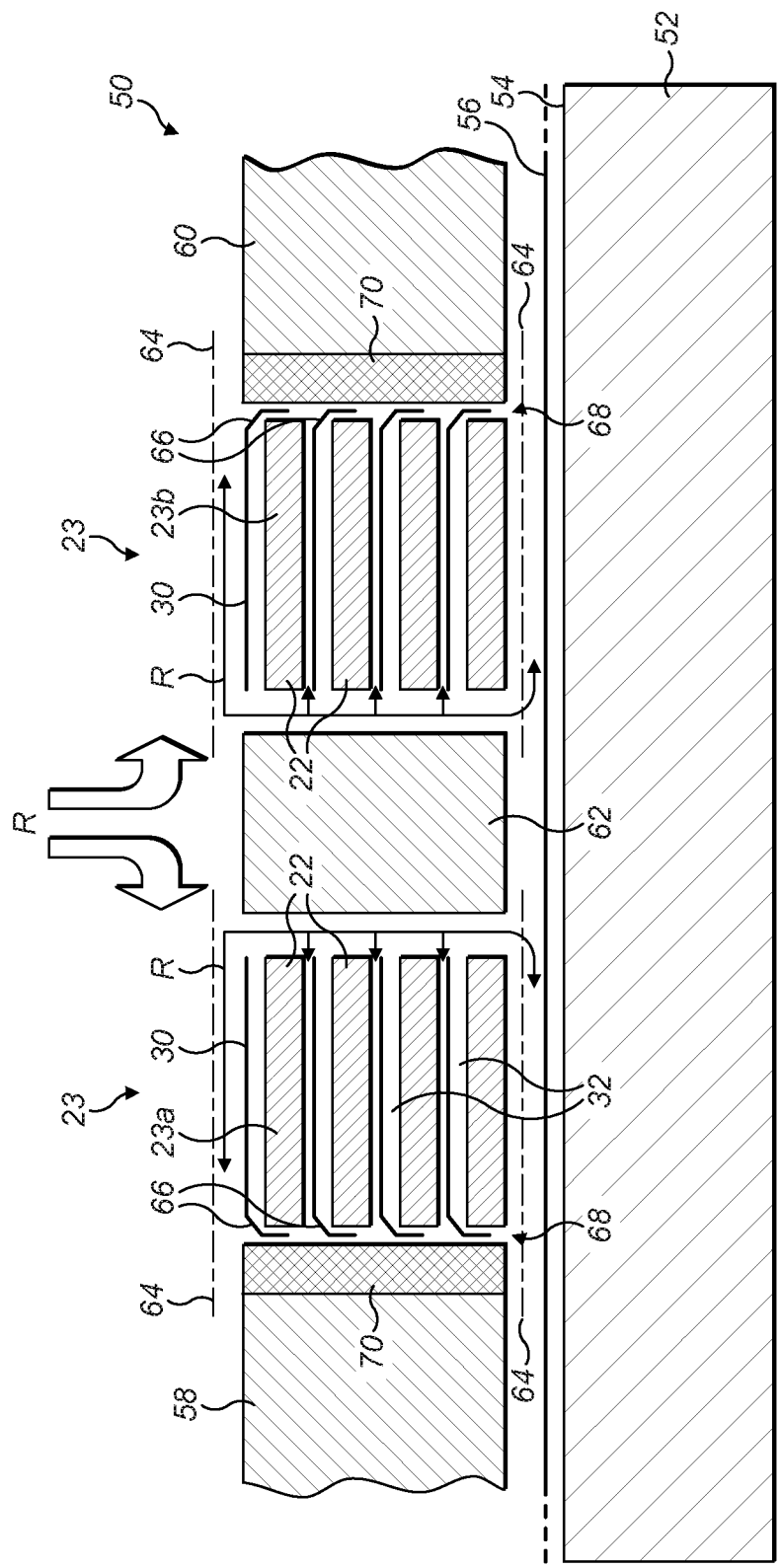
FIG. 5 is a schematic view of a part of a blade shell in a mould illustrating a first layup arrangement.
Figure 6:
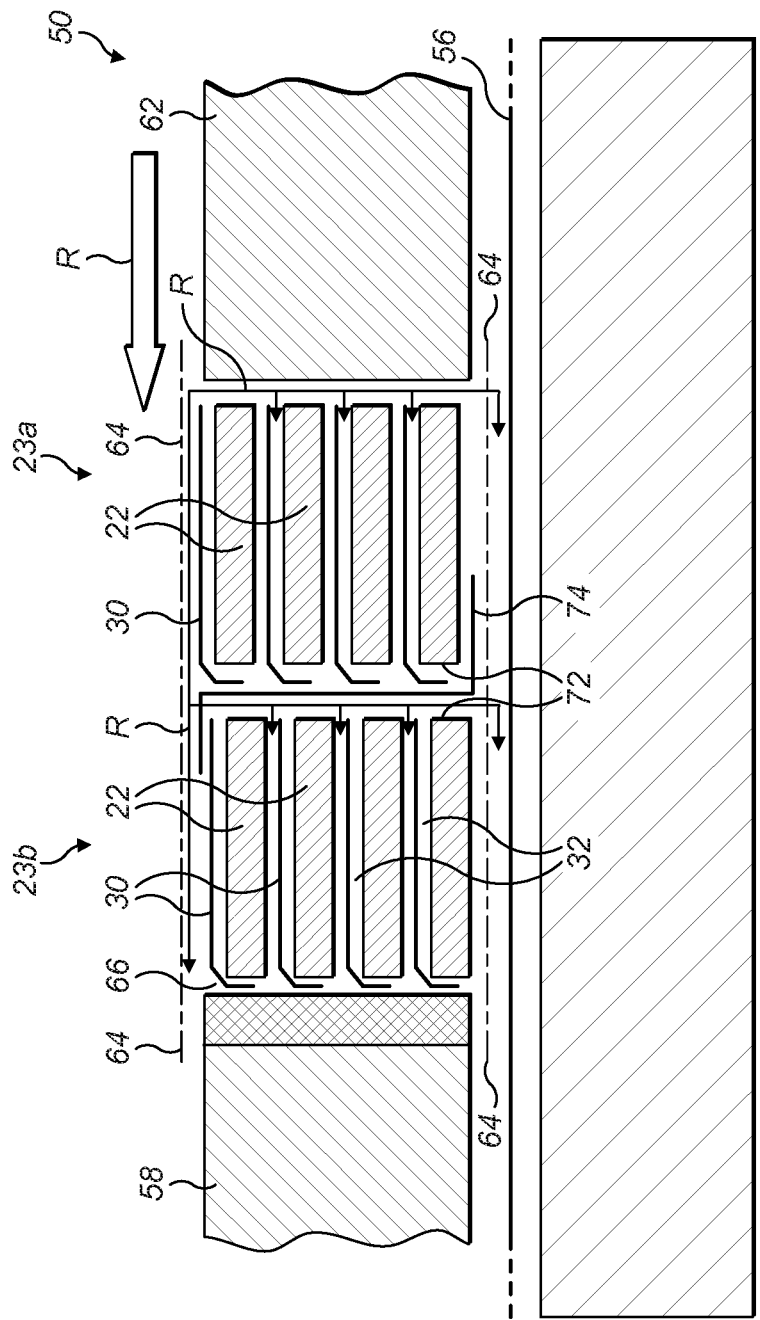
FIG. 6 is a schematic view of a part of a blade shell in a mount illustrating a second layup arrangement.

Turning now to FIGS. 5 and 6. The infusion promoting layer 30 has been described in detail above with reference to FIGS. 2 to 4. However, FIGS. 5 and 6 demonstrate how a stack structure including pultruded strips and infusion promoting layers may be built up within a blade fabrication process.

Referring firstly to FIG. 5, a blade layup 50 is shown assembled on a blade mould 52 which provides a mould surface 54. Note that the mould surface 54 is shown as being flat; this is for clarity purposes, although it will be understood that in practice the blade mould would have a degree of curvature so as to define the aerodynamic outer skin of the blade.

The outer skin of the blade is formed from a dry glass fibre fabric layer (or layers) 56 that is positioned directly onto the mould surface 54. A mould release coating is typically pre-applied to the mould surface 54 to discourage bonding between the fabric layer 56 and the surface 54, although such a coating is not shown here.

Once the outer skin of the blade is established by the fabric layer(s) 56, the remaining layup components are built up. In overview, the components of the layup comprise structural foam cores including a leading edge core 58, a trailing edge core 60 and a central core 62, and two stack structures 23 which form the spar caps of the blade, comprising interleaved pultruded strips 22 and infusion promoting layers 30 as described above. A first one of the stack structures 23a is positioned between the central core 62 and the leading edge core 58, and a second one of the stack structures 23b is positioned between the central core 62 and the trailing edge core 60. Note that the general configuration of the layup is like that shown in FIG. 1, although only a subsection of the layup is shown here in order to focus on the key components.

In order to guard against the formation of steps and wrinkles between the upper and lower surfaces of the stack structures 23 and the cores 58-62, fabric strips 64 in the form a pre-cured glass-fibre epoxy resin composite material are overlaid on the upper and lower surfaces of the stack structures 23 so that they cover not only the stack structures 23 but also the margins of the adjacent cores 58-62. Although not shown here, a further layer of dry glass fibre fabric is applied over the layup 50 which forms the inner skin of the blade.

Turning to the stack structures 23 themselves, it can be seen that the infusion promoting layers 30 are configured to be wider than the strips 22 with which they are interleaved, such that an edge 66 of the layers 30 overlaps the edge of the strips 22. Here, the layers 30 only overlap one edge of the strip 22 so that the edge of the strips 22 adjacent the central core can be abutted tightly up against the core. However, a slight overlap is acceptable.

The overlapping edges 66 of the layers 30 protect the edges of the strips 22 during the layup process to avoid damage occurring to the sharp edges of the stack structures 23. The overlapping edges 66 also create, in effect, a fabric 'wall' 68 down the side face of the stack structure 23 which promotes a predictable and complete coverage of resin over the stack. Porous infill blocks 70 such as polyester wadding are provided in the gap between the stack structures 23 and the leading/trailing edge cores respectively. The infill blocks 70 fill any spaces that are present between the stack structures 23 and the leading/trailing edge cores so that resin cannot track back to fill other areas of the blade and provides strength to the resin that floods into this area.

The resin infusion path is indicated by the arrows 'R', and it will be appreciated that the resin is introduced near to the central core 62 whereby it propagates to the left and right to the leading and trailing edges of the layup. In this way, the resin works its way into the stack structures 23 at the side adjacent to the central core 62 and then infiltrates outwardly through the infusion promoting layers 30 between the strips 22. Here, it will be appreciated that the speed of the resin infusion between the strips 22 is important because if the resin infuses too slowly there is a risk that resin will infiltrate inwardly from the opposite side of the stack structure 23. This can cause airlocks which compromises the structural integrity of the stack structure 23. The overlapping edges 66 provide a further means to guard against this 'back infusion' since they provide a partial barrier against the inward infusion of resin and increase the likelihood that the resin will be able to complete the outwards infusion through the stack. Turning to FIG. 6, here is shown an embodiment of part of a layup 50 having a twin stack spar cap arrangement that is sometimes used depending on the rigidity required of the blade. In this embodiment, two stack structures 23a, 23b are arranged side-by-side between a leading edge core 58 and a central core 62 of structural foam. The arrangement of the components in the layup 50 of this embodiment are similar to that in the previous embodiment, so only the differences will be described here.

In this embodiment, the first stack structure 23a is positioned next to the central core 62 and the second stack structure 23b is positioned next to the leading edge core 58 such that the stack structures 23a, 23b have opposing faces 72. Note that the infusion promoting layers 30 of each of the stack structures 23a,23b overlap or extend beyond the edges of the strips 22 so that the overlapping edges meet at the gap between the stack structures 23a, 23b. Furthermore, a partitioning layer 74 is provided in between the stack structures 23a, 23b and the overlapping edges are in contact with the partitioning layer 74. The partitioning layer 74 is the same type of fabric as the infusion promoting layer, although this is not essential. The overlapping edges 66 and the partitioning layer 74 together create a fibrous structure between the stack structures 23a,23b which provides two principle benefits; firstly it protects the opposing faces of the stack structures 23a,23b during the layup process and, secondly, it provides a medium which encourages the resin to transition from the first stack structure 23a to the second stack structure 23b but also to infuse from above, down through the gap between the stack structures 23a,23b.

In a similar manner to the previous embodiment, a porous infill block 70 is provided in the gap between the outer stack structure 23b and the leading edge core 58.

The resin infusion path is again indicated by the arrows denoted 'R'. The resin is introduced under partial vacuum near to the central core 62 whereby it propagates outwardly towards the leading edge of the layup 50. Thus, the resin works its way into the inner stack structure 23a at the side adjacent to the central core 62 and then infiltrates outwardly through the infusion promoting layers 30 between the strips 22. The resin also passes across the top surface of the first stack structure 23a towards the gap between the stack structures 23a, 23b. Again, swift infusion between the strips 22 in the first stack structure 23a is important here so that the resin infiltrates completely through the first stack structure 23a at the same time as resin starts to move down between the adjacent structures 23a,23b.

Various alternatives to the specific embodiment have been explained above. However, the skilled person will appreciate that variations may be made to the specific embodiment without departing from the scope of the invention as defined by the claims.

For example, the stack structures discussed above have been described as having the same type of infusion promoting layer interleaved between each pair of strips. However, this need not be the case and different infusion promoting layers may be applied to different gaps between the strips. In this way, the infusion speed through the stack can be influenced on a layer-by-layer basis.

The invention claimed is:

1. A wind turbine blade including an elongate reinforcing structure, the reinforcing structure comprising a plurality of strips of fibre-reinforced polymer pultrusions arranged into a stack structure, and each adjacent pair of the plurality of strips including an infusion promoting layer interleaved therebetween, wherein the infusion promoting layer is a fabric comprising a plurality of twisted yarns, such that the fibres of the yarns are arranged in a spiral formation about a yarn axis,
   wherein the twisted yarns influence an infusion speed of a resin through the stack structure.

2. The wind turbine blade of claim 1, wherein the fabric areal weight of the infusion promoting layer is between 100 gsm and 300 gsm.

3. The wind turbine blade of claim 2, wherein the fabric areal weight of the infusion promoting layer is 200 gsm.

4. The wind turbine blade of claim 1, wherein the infusion promoting layer is selected to have a weave pattern of at least one of the group including: a plain weave pattern, a twill weave pattern, a satin weave pattern.

5. The wind turbine blade of claim 1, wherein the yarns of the infusion promoting layer are oriented in a 0/90° configuration or in a +/−45° configuration.

6. The wind turbine blade of claim 1, wherein the infusion promoting layer is a glass-fibre fabric, and wherein the twisted yarns are formed from glass.

7. The wind turbine blade of claim 1, wherein the infusion promoting layer is arranged in the stack structure so that the infusion promoting layer extends beyond an end of the strip and overlaps a side face of the stack structure.

8. The wind turbine blade of claim 1, wherein the twisted yarns increase the infusion speed of the resin through the stack structure.

9. A method of assembling a wind turbine blade, comprising:
arranging a plurality of blade components in a blade mould; and
assembling an elongate reinforcing structure in the blade mould relative to the plurality of blade components, wherein the elongate reinforcing structure comprises a plurality of strips of fibre-reinforced polymer pultrusions arranged in a stack structure, each adjacent pair of the plurality of strips including an infusion promoting layer interleaved therebetween,
wherein the infusion promoting layer is a fabric comprising a plurality of twisted yarns, such that the fibres of the yarns are arranged in a spiral formation about a yarn axis,
wherein the twisted yarns influence an infusion speed of a resin through the stack structure during a resin infusion process, and
wherein the infusion promoting layer is selected such that the infusion speed of resin through the stack structure during the resin infusion process is substantially matched with the resin infusion speed through the plurality of blade components.

10. The method of claim 9, wherein the infusion promoting layer has a fabric areal weight between 100 gsm and 300 gsm.

11. The method of claim 10, wherein the infusion promoting layer has a fabric areal weight of 200 gsm.

12. The method of claim 9, wherein the yarns of the infusion promoting layer are oriented in a 0/90° configuration or a +/−45° configuration.

13. The method of claim 9, wherein the infusion promoting layer is arranged in the stack structure so that the infusion promoting layer extends beyond an end of the strip and overlaps a side face of the stack structure.

14. The method of claim 9, including applying one or more straps to the stack structure to prevent relative movement of the plurality of strips.

15. The method of claim 9, wherein the twisted yarns increase the infusion speed of the resin through the stack structure during the resin infusion process.

16. A method of assembling a wind turbine blade in a blade mould, comprising:
arranging a plurality of blade components in a blade mould; and
assembling an elongate reinforcing structure in the blade mould relative to the plurality of blade components, wherein the elongate reinforcing structure comprises a plurality of strips of fibre-reinforced polymer arranged in a stack structure, at least one adjacent pair of the plurality of strips including an infusion promoting layer interleaved therebetween,
wherein the infusion promoting layer is selected so as to influence the infusion of resin through the stack structure during a resin infusion process,
wherein the infusion promoting layer is arranged in the stack structure so that the infusion promoting layer extends beyond an end of the strip and overlaps a side face of the stack structure.

17. The method of claim 16, wherein the infusion promoting layer is selected so as to influence the speed of resin infusion through the stack structure.

18. The method of claim 17, wherein the infusion promoting layer is selected to be a woven fabric comprising a plurality of interlaced twisted yarns.

19. The method of claim 18, wherein the infusion promoting layer is selected to have a fabric areal weight of between 100 gsm and 300 gsm.

20. The method of claim 19, wherein the infusion promoting layer is selected to have a fabric areal weight of 200 gsm.

21. The method of claim 17, wherein the infusion promoting layer is selected to be a biaxial fabric having first and second yarn layers oriented in a +/−45° configuration.

22. The method of claim 16, wherein the infusion promoting layer is selected such that the infusion speed of resin through the stack structure during a resin infusion process is compatible with the resin infusion speed through the plurality of blade components.

23. An infusible layer or strip configured to be interleaved into a stack of pre-formed structural strips of fibre reinforced polymer so as to form a stacked spar structure of a wind turbine blade, the infusible layer or strip being configured to space apart adjacent pairs of structural strips, wherein the infusible layer or strip is compatible with a resin used in the infusion process and is further configured to permit the resin to infuse therethrough so that the infusible layer or strip can be integrated with the spar structure in a finished wind turbine blade, wherein the infusible layer or strip is a woven fabric in which the yarns of said fabric are twisted, such that the fibres of the yarns are arranged in a spiral formation about a yarn axis.

24. A method of assembling a wind turbine blade, comprising:
arranging a plurality of blade components in a blade mould,
assembling an elongate reinforcing structure in the blade mould relative to the plurality of blade components, wherein the elongate reinforcing structure comprises a plurality of strips of fibre-reinforced polymer arranged in a stack structure, at least one adjacent pair of the plurality of strips including an infusion promoting layer interleaved therebetween,
wherein the infusion promoting layer is selected such that the infusion speed of resin through the stack structure during a resin infusion process is compatible with the resin infusion speed through the plurality of blade components,
wherein the infusion promoting layer is selected to be a woven fabric comprising a plurality of interlaced twisted yarns, such that the fibres of the yarns are arranged in a spiral formation about a yarn axis.

25. The method of claim 24, wherein the infusion promoting layer is selected to be a biaxial fabric having first and second yarn layers oriented in a +/−45° configuration.

26. The method of claim 24, wherein the infusion promoting layer is selected to have a fabric areal weight of between 100 gsm and 300 gsm.

27. The method of claim 26, wherein the infusion promoting layer is selected to have a fabric areal weight of approximately 200 gsm.

* * * * *